United States Patent [19] [11] 4,296,420
Dambach et al. [45] Oct. 20, 1981

[54] CHART RECORDER HAVING PRESSURIZED INK SUPPLY AND Z FOLD PAPER FEED AND IMPROVED CHART RECORDING METHOD

[75] Inventors: Thomas F. Dambach, Glendale; James R. Ricketts, Milwaukee, both of Wis.

[73] Assignee: Marquette Electronics, Inc., Milwaukee, Wis.

[21] Appl. No.: 740,003

[22] Filed: Nov. 8, 1976

[51] Int. Cl.³ .................. G01D 15/16; G01D 15/34
[52] U.S. Cl. .................. 346/140 R; 346/136
[58] Field of Search ............... 346/136, 140 R

[56] References Cited
U.S. PATENT DOCUMENTS

| Re. 25,692 | 12/1964 | Brown, Jr. | 346/140 X |
| 3,080,561 | 3/1963 | Bowditch et al. | 346/116 |
| 3,360,799 | 12/1967 | Polster | 346/29 |
| 3,646,569 | 2/1972 | Erbach et al. | 346/136 |
| 3,854,145 | 12/1974 | Carroll, Jr. et al. | 346/136 X |

Primary Examiner—George H. Miller, Jr.
Attorney, Agent, or Firm—Andrus, Sceales, Starke & Sawall

[57] ABSTRACT

A chart recorder has a writing platen over which a moving strip of recording medium passes. The recording medium is Z folded along slotted lines. The tip of the tubular pen of a pressurized ink supply system is forced into contact with the strip as it passes over the platen. A pressure plate is positioned adjacent the pen for pressing the strip onto the platen. A capstan drive is located downstream of the writing platen to draw the strip off a Z folded supply stack past the pressure plate and over the writing platen. The pressure plate exerts a drag on the recording medium strip which tensions the strip to further cause it to lie flat across the writing platen. The pressure of the plate and the tension of the strip as well as the size relationship between the pen tip and the slots facilitate passage of the pen over the lines of slots.

17 Claims, 6 Drawing Figures

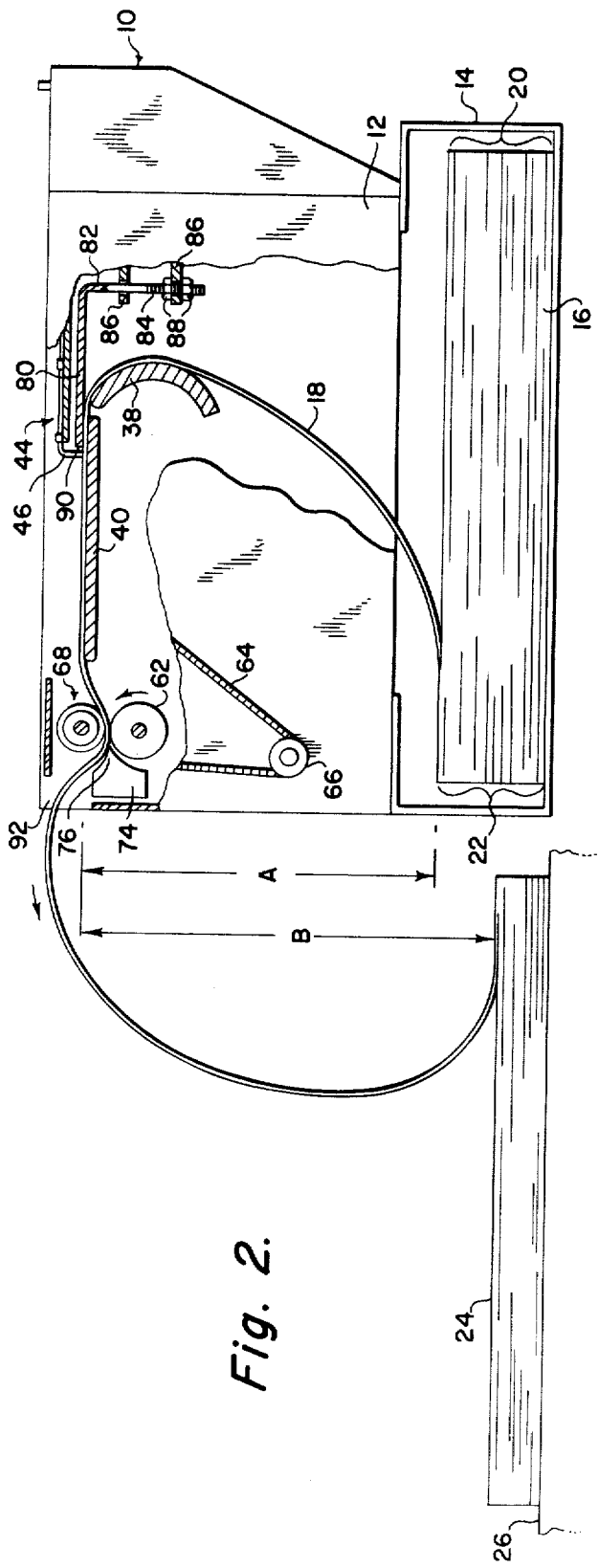
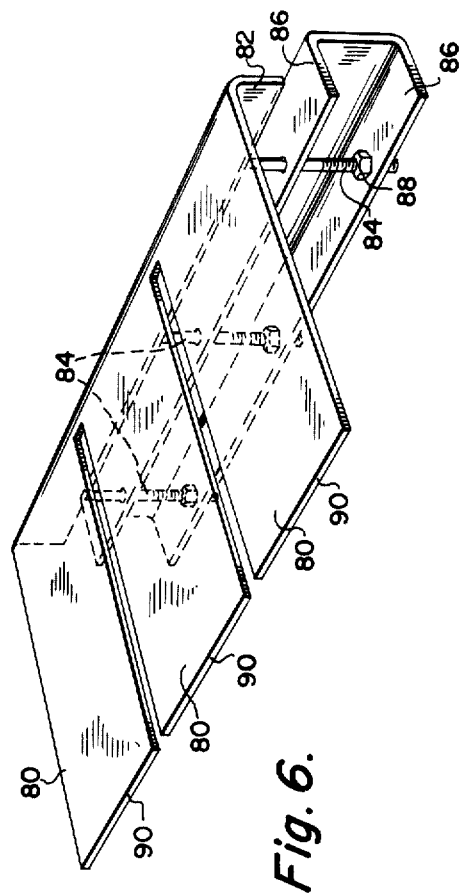
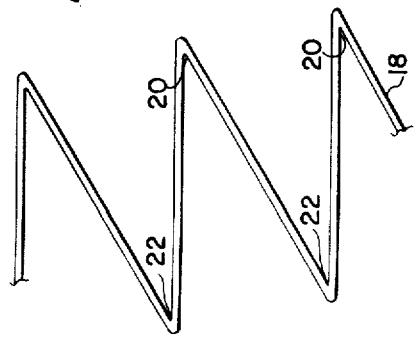

CHART RECORDER HAVING PRESSURIZED INK SUPPLY AND Z FOLD PAPER FEED AND IMPROVED CHART RECORDING METHOD

BACKGROUND OF THE INVENTION

1. Field of the Invention

The present invention relates to an oscillograph or direct writing chart recorder employing a pressurized fluid pen inking system and a Z fold paper feed and to an improved recording method.

2. Description of the Prior Art

A chart recorder is commonly used to provide a graphic record of transient phenomena. In such a recorder, a strip of paper is moved past a pen at a selected speed. The pen is driven by a motor, typically a D'Arsonval movement. The phenomena to be recorded is converted to a proportional electrical current which is passed through the coil of the D'Arsonval movement to deflect the pen and provide the graphic record on the moving paper strip.

Various types of pens may be used to provide the recording. A simple capillary system may be used. However, the acceleration forces on the pen arising during transient deflection may exceed the capillary force on the ink, causing drops of ink to be whipped off the pen. Starting the flow of ink and preventing drying of the ink in periods of non-use are also a problem.

Systems without ink have been developed. A thermally sensitive composition may be applied to the paper. The pen comprises a heated stylus which, when applied to the thermally sensitive composition, provides visually observable indicia. However, rapid movements of the pen reduce the width of the line, making the graphic record difficult to read.

A pen system which overcomes many of the foregoing disadvantages is the hydrostatic pressure inking system described in U.S. Pat. No. Re. 25,692 to Brown, Jr. In this system the pen comprises a hollow tube. A viscous ink is forced through the tube under pressure and the tip of the pen is sealed against the paper by a bias force correlated to the ink pressure. The system works best with a chart paper having a hard finish formed by a clay coating or filler.

The strip of paper is commonly supplied to the recorder in a roll as shown, for example, in the Brown, Jr. patent. However, such rolls are awkward to store prior to use. In the machine, the entire roll must be accelerated each time the strip is advanced through the machine. The inertia of the roll places a limit on the size of the roll which may be used and the variations in the inertia and torque arm as the roll is consumed make control difficult. The roll causes a curl in the strip which varies as the diameter of the roll varies. The paper record, with its curl, is often hard to store.

Other types of paper feed have been considered, including a Z folded strip of paper. Such a strip is alternately folded in opposite directions at predetermined locations so as to form a "Z". The strip contains transverse lines of perforations at the predetermined locations to effect the folding. The strip, when so folded, lies in a stack.

A Z fold feed avoids many of the problems of a roll fold. The amount of paper which must be accelerated during movement through the recorder is minimal and remains relatively constant. The height of the stack may be usually easily increased to increase the size of the paper supply. Excessive curl is not present and the strip may be separated at the folds to provide sheets which are easily handled and filed.

However, there has not heretofore been available a commercially successful recorder employing a Z fold paper feed and a pressure ink system of the type disclosed in the aforesaid U.S. Patent. This is due to one or more of the following reasons. The pen tended to hang up on the perforations at the folds, particularly since it is forced onto the surface of the paper with the sealing pressure. Ink from the pen bled through at the perforations. The paper fibers exposed at the perforations clogged the pen.

To obtain some of the advantages of a Z fold feed in a pressure ink recorder, it has been proposed to provide such a recorder using a roll feed with paper perforated at predetermined intervals. The roll is perforated from the back side in an effort to maintain the integrity of the coating as complete as possible, thereby to accommodate the pen of the pressure ink system. After the strip passed under the pen, it was Z folded by machine or by hand. Unfortunately, such a recorder tended to have all of the disadvantages of both a roll fed device and a Z fold fed device and few of its advantages.

SUMMARY OF THE PRESENT INVENTION

It is, therefore, the object of the present invention to provide a recorder and recording method which accommodate both a pressure ink system and a Z fold paper supply while avoiding such prior art problems as pen hang up and ink bleed-through.

In the present invention a graphic recording is provided on a paper strip Z folded along lines of perforation. The strip moves through the recorder of the present invention along a path of movement from a Z folded supply stack to a Z folded discharge stack. A writing platen is mounted in the recorder over which the strip passes during its movement. A pressurized ink supply stream has at least one tubular pen positioned above the platen and urged into contact with the strip as it passes over the platen. A pressure means, typically a plate, lying generally parallel to the writing platen, engages the strip adjacent the pen tip for forcing it onto the platen. A drive means is positioned downstream of the writing platen for drawing the strip off the supply stack and over the platen. The tension generated in the strip between the pressure means and the drive means further serves to cause the strip to lie flat across the platen. The pressure of the pressure plate and the tension in the strip facilitates passage of the writing pen over the perforations in the Z folded recording medium.

Such passage is also facilitated by coordinating the size of perforations, with the external dimension of the pen tip. The perforations are typically elongated slots and the external dimension of the pen may be greater than the length of the slots or less than that length by a predetermined amount. In pen recorders having suitable strip movement and pen movement speeds, the external dimension of the pen may also be less than the slots since the coordinated movement of the pen and strip facilitates passage of the pen.

BRIEF DESCRIPTION OF THE DRAWING

FIG. 2 is a partially broken away side view of the improved chart recorder of the present invention.

FIG. 3 is a partial side view of a strip of recording medium in a Z fold.

FIG. 6 is a perspective view of a pressure plate apparatus for use in the improved chart recorder of the present invention.

DETAILED DESCRIPTION OF THE PREFERRED EMBODIMENT

Figure 1:
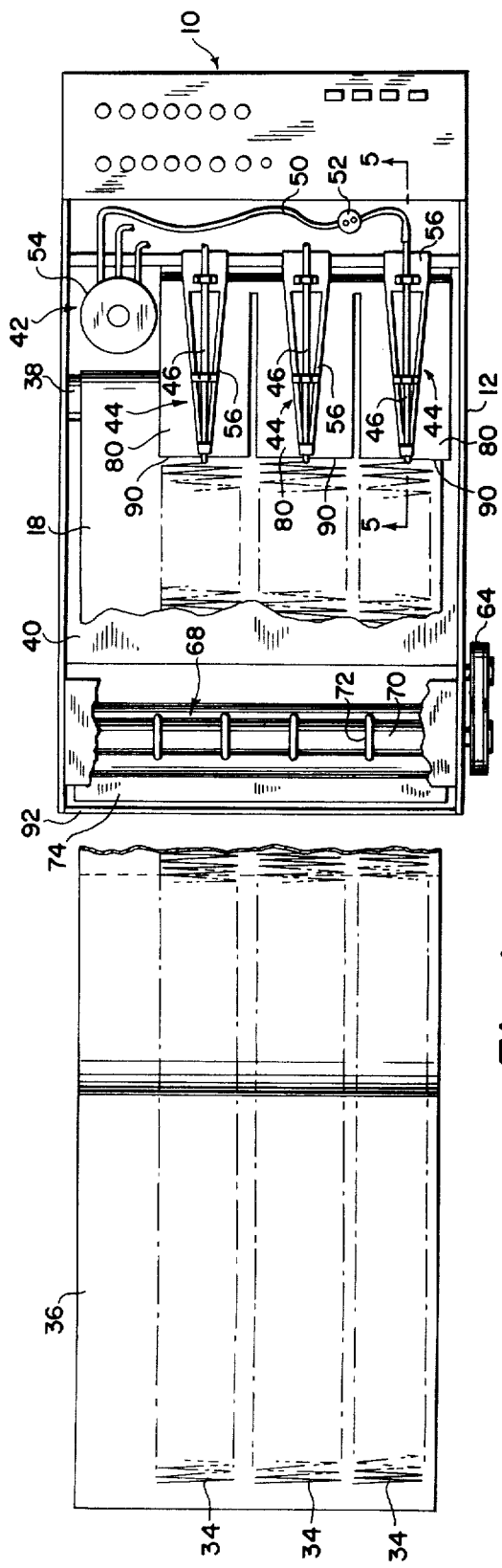
FIG. 1 is a plan view of the improved chart recorder of the present invention with portions thereof broken away for clarity.

In FIGS. 1 and 2, the improved chart recorder of the present invention is identified by the numeral 10. Recorder 10 includes frame 12 formed of sheet metal or other suitable material on which the elements of the recorder may be mounted. Frame 12 may include holder 14 for a supply stack 16 of strip 18 of recording material. Strip 18 is typically formed of paper having a clay coating to provide a hard glossy finish. Such paper may comprise, or be similar to, 55 lb. magazine stock. Paper suitable for use as strip 18 is available as "Krome-Kote"0 from Champion Paper Co. of Hamilton, Ohio or "Gemcote" from Wyomissing Paper Co. of Reading, Pennsylvania.

Figure 4:
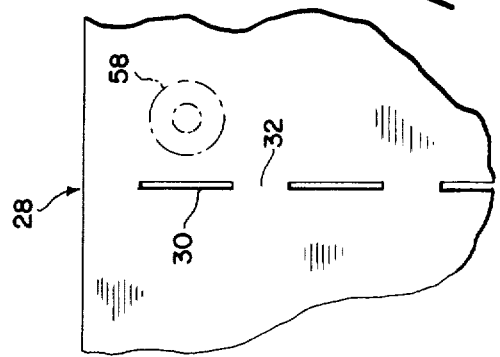
FIG. 4 is a fragmentary plan view of the recording medium strip suitable for use in the recorder of the present invention.

As shown in FIG. 3, strip 18 is Z folded, being creased first in one direction at fold 20 and then in the other direction at fold 22, and so on. As shown most clearly in the detailed fragmentary view of FIG. 4 and hereinafter described in detail, the Z folding of strip 18 is assisted by perforation lines 28 lying transverse to the longitudinal dimension of the strip. While various types of perforations may be employed, each line 28 typically consists of alternate slots 30 and lands 32. Lines 28 are formed at predetermined locations along strip 18. The location of lines 28 determines the dimension of Z folded supply stack 16 and discharge stack 24. Since the perforations of lines 28 permit the strip to be conveniently severed into sheets along the lines, their location also determines the size of the sheets formed from strip 18. Strip 18 is typically 8½ inches wide and lines 28 are formed every 11 inches along the strip so that the resulting sheets are 8½ inches by 11 inches.

The folded strip lies in stack 16 with folds 20 at one end and folds 22 at the other end. Strip 18 is passed through recorder 10 along a path of movement extending from supply stack 16 to the Z folded discharge stack 24 located on receiving means 26.

Recorder 10 may be of the type commonly termed a "three channel recorder" in which three graphic recordings are simultaneously undertaken. Strip 18 may thus have three longitudinal graphs 34 as shown in FIG. 1. A border or marginal area 36 may be used to write identifying indicia, make notes, etc.

Guide means 38 is typically mounted on frame 12 above stack 16 to faciliate the movement of sheet 18 from stack 16 to the other portions of recorder 10. Guide means 38 is shaped to aid this transition and for this purpose may have a convex outer surface curved transversely to the path of movement of strip 18 through recorder 10 along which strip 18 is received. Guide 38 may be generally centered over stack 16.

As strip 18 is removed from Z folded stack 16 for movement through recorder 10, it is alternately pulled from opposite ends of stack 16. To insure proper feeding it is necessary that a minimum distance, shown as A in FIG. 2 exist between guide 38 and the top of supply stack 16 to avoid sharp creases in strip 16. Distance A is typically one half the length of the sheets in strip 18 parallel to the direction of movement, i.e. one half the distance between lines 28 of perforations.

A horizontal writing platen 40 is mounted on frame 12 downstream of guide means 38 along the movement path of strip 18. Writing platen 40 lies underneath strip 18 as it passes through recorder 10 to provide a hard surface on which the graphic recording may be undertaken.

Figure 5:
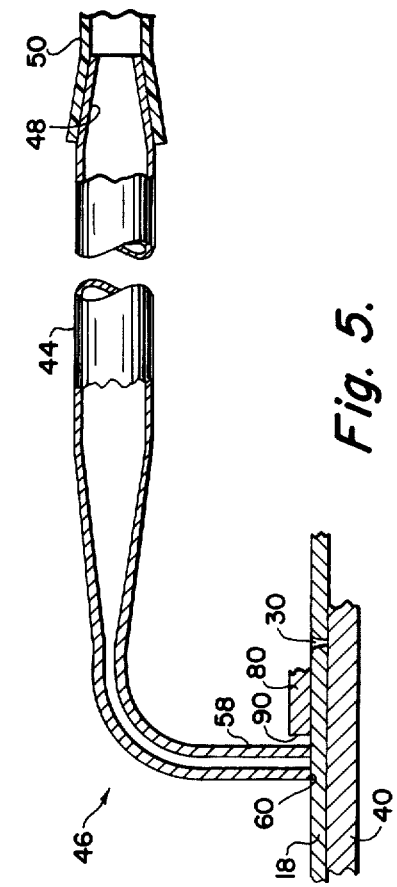
FIG. 5 is a partial cross sectional view of a pen suitable for use in the present invention taken generally along the line 5—5 of FIG. 1.

Pressure inking system 42 includes a writing element 44 for each recording channel, three such elements being shown in FIG. 1. As shown in FIG. 5, each element 44 consists of tubular pen 46 having a slightly tapered end 48 for receiving supply hose 50. Hose 50 is connected through valve 52 to pressurized reservoir 54 in the manner described in U.S. Pat. No. Re. 25,692. Pens 46 may be mounted in holders 56 connected to pen motors of conventional construction, not shown, which deflect the pens in accordance with electrical input signals.

The other end of tube 46 is typically necked down to a reduced diameter tip section 58 and bent through 90°. The lower end of tip 58 forms a flat annular surface 60 which engages strip 18 as it passes over writing platen 40, as shown in FIGS. 2 and 5. Annular surface 60 of pen 46 may be forced onto strip 18 by a leaf spring means contained in holder 56 which provides the necessary bias force to the pen required for coaction with pressurized ink reservoir 54.

A drive means is mounted in frame 12 downstream of platen 40 for moving strip 18 through recorder 10. As shown in FIG. 2, a capstan 62, journalled in frame 12, may be connected through belt 64 to the output shaft 66 of a motor. A directional slip clutch may be incorporated in capstan 62 and in an idler gear, not shown, so that capstan 62 may be driven at different speeds by reversing the direction of rotation of shaft 66. An idler roll 68 tangently engages capstan 62, as shown in FIG. 2. As shown in FIG. 1, idler roll 68 may be formed of cylinder 70 having a plurality of O rings 72 on the periphery. Strip 18 passes between capstan 62 and idler roll 68.

In order to insure that strip 18 is properly discharged from chart recorder 10, a diverter 74 is employed in association with capstan 62 and idler roll 68. Diverter 74 includes a wedge shaped portion 76 which is positioned closely adjacent the point of tangential engagement of capstan 62 and idler roll 68. Diverter 74 insures that strip 18 is discharged along the upper surface of the wedge shaped portion 76 rather than being carried down around capstan 62 by gravity, electrostatic attraction, or adhesion to the resilient material of the capstan. Wedge shaped portion 76 thus peels strip 18 off capstan 62 and deflects it over its upper surface. The spacing of wedge shaped portion 76 from capstan 62 and idler roll 68 approximates the thickness of strip 18 and preferably should not be more than twice the thickness of strip 18. For example, if strip 18 is formed of paper 0.0035 inches thick, the spacing of wedge shaped portion 76, capstan 62 and idler roll 68 may be approximately 0.004 inches.

A salient feature of the present invention is the provision of a means for pressing strip 18 onto platen 40 just ahead, or upstream, of the point of contact of pen tip 58 with strip 18. For this purpose, plate 80 may be employed. As shown in FIG. 2, plate 80 overlaps the upstream end of writing platen 40. Strip 18 passes between writing platen 40 and plate 80. Plate 80 may terminate in depending portions 82 having one or more threaded shafts 84. Shafts 84 are retained in holes in flanges 86 in housing 12. By tightening or loosening nuts 88 on the lower ends of shafts 84, plate 80 is raised or lowered.

Plate 80 may extend uninterruptedly across the width of strip 18 or, as shown in FIGS. 1 and 6, an individual portion, or separate plates 80, may be provided for pressing against strip 18 in the area of each of the three graphs 34.

Plate 80 serves a dual purpose. First, it eliminates the billowing, or raising, of strip 18 off of platen 40 adjacent pens 44 which heretofore has occurred. During application of the clay coating to strip 18 in the paper manufacturing process, the strip is unwound from one roll, coated, and rewound on another roll. Even though the strip may be subsequently perforated and Z folded, the paper, because of its heavy coating, retains a memory of the curved configuration in which it found itself in the processing roll. When passing through chart recorder 10, this memory reasserts itself as the aforesaid billowing of the strip off the platen 40. The passage of strip 18 around guide means 38 may also accentuate the billowing properties in the strip. The billowing makes it difficult to adjust the various operating characteristics of the pen, including the force of the pen against the paper and tends to open slots 30 of transverse lines 28 exposing fibers which may clog pen 44.

To eliminate the billowing, pressure plate 80 is positioned so that the downstream edges are closely adjacent the point where pens 44 contact strip 18. The spacing between the pens 44 and the downstream edges 90 of plates 80 may be as little as 1 mm. Plates 80 thus provides a direct pressure on strip 18 at the point of writing.

A second advantage afforded by plate 80 is the establishment of the tension or tautness in strip 18 by the drag produced by plate 80 and the pull produced by the drive means. This tension further, but in a more indirect manner, serves to insure that strip 18 will be in intimate contact with platen 40. For this purpose, the point of tangential engagement of capstan 62 and idler roll 68 should be in or below the plane of platen 40. To provide the tension, plate 80 is typically positioned to press strip 18 between writing platen 40 and plate 80 so that a predetermined force is required to move strip 18 through recorder 10. At present, a pressure adjustment of plate 80 such that a pull of 1.5 pounds is required to move a strip 8½ inches wide through recorder 10 is deemed preferable.

The use of plate 80 and the resulting pressure and tension minimizes the effect of slots 30 of line 28 by insuring that strip 18 lies tightly against platen 40 so that no creasing at the folds can occur. This prevents the hanging up of pen 44 in fold lines 28 and minimizes bleed-through.

Certain considerations in the configuration of lines 30 of slots 28 in strip 18 also serve to minimize any detrimental effects of slots 28 in the operation of pressure inking system 42 and the production of the graphic recording. Thse considerations involve the dimensional relationship between tip 58 of pen 44 and slot 30. A typical pen 44 for use in chart recorder 10 of the present invention has an outside diameter of 0.022 inches and an internal diameter of between 0.007 and 0.01 inches. Slots 30 are usually die cut in strip 18 with a die having a knife edge so that the width of slots 28 is less than the internal diameter of pen tip 58. This assists in preventing bleed-through and hang up of the pen tip. In contrast to prior practice, it has been found preferable to conduct the die cutting operation from the coated surface from strip 18 since the die cutting tends to round the upper longitudinal edges of slots 30, facilitating the passage of pen tip 58.

The length of slot 30 is of significance in the coaction of pen tip 58 and strip 18. In many cases it is possible to make the length of slot 30 smaller than the outside diameter of pen tip 58 to facilitate the passage of pen tip 58 over slots 30. However, this may not in all cases be possible, since it is often desired to lengthen slots 30 for reasons of manufacturing ease and ease of tearing and folding while the weight and inertia of pen 44 must be minimized through the use of a small pen tip. It has been found that the dimension of pen tip 58 may be somewhat smaller than the length of slots 30 while still maintaining satisfactory operation of chart recorder 10. For example, a pen tip 58 having an outside diameter of 0.007 inches smaller than the slot length has been successfully used and it is believed that differences of up to 0.01 inches or more may be successfully employed.

In addition to the foregoing discrete dimensional considerations, the relationship of pen outside diameter to slot length may also be determined as a function of paper speed since the faster the slot crosses the tip the less chance for ink bleed and the possibility of hang up. Further, there tends to be a minimum speed, for example, 1 mm/sec, for strip 18 below which the operation of chart recorder 10 is not highly satisfactory due to bleed-through at fold lines 28.

The rapidity of the pen movement in conjunction with paper speed also bears consideration. The vectoring produced by combining the mutually perpendicular pen movement and paper movement is sufficient to insure that, in a great majority of instances, movement of pen tip 58 over a line 28 will occupy at least a portion of a land 32. This also permits an increase in slot length with respect to the outside diameter of pen 44 and facilitates passage of pen 44 over fold line 28.

Strip 18 is discharged from chart recorder 10 through discharge port 92 and deposited in discharge stack 24. In order to eliminate any curl in strip 18 induced, particularly, by passage through drive means 62 and to permit the memory of the paper with respect to its original Z folded condition to be restored, thereby to enable strip 18 to be Z folded into stack 24, it is necessary to provide the minimum vertical distance between discharge port 90 and the top of stack 24 identified as distance B in FIG. 2. This distance is typically one and one half times the length of the sheets of strip 18 parallel to the direction of movement, i.e. one and one half the distance between the lines 28 of perforations.

Various modes of carrying out the invention are contemplated as being within the scope of the following claims particularly pointing out and distinctly claiming the subject matter which is regarded as the invention.

We claim:

1. A chart recorder for providing a graphic recording on a Z-folded recording medium strip having a path of movement through the recorder from a supply stack to a discharge, said recorder comprising:

a frame;

a writing platen mounted on said frame along the path of movement of the strip and presenting a flat, hard surface over which said strip passes;

a pressurized ink supply system having at least one pen positioned above said platen and having a tip urged into contact with said strip as it passes over said platen;

drive means positioned downstream of said writing platen for engaging the strip to draw it off the supply stack and over the writing platen; and pressure means mounted on said frame, said pressure means including a flat pressure plate positioned over the surface of said platen and lying generally parallel thereto, said plate being positioned adjacent said pen tip immediately upstream thereof for pressing the strip flat onto the platen under said pressure plate and pen tip and for generating tension in the strip when it is moved by the drive means which further causes the strip to lie flat across the platen.

2. The chart recorder according to claim 1 wherein the point at which said drive means engages the strip is in or below the plane of said platen.

3. The chart recorder according to claim 1 wherein the discharge by of said recorder includes means for receiving said strip, said receiving means being positioned below said discharge by at least a minimum distance to allow said strip to assume a Z folded stack in said receiving means.

4. The chart recorder according to claim 1 wherein said pressure ink supply system has a plurality of pens having tips and said pressure means includes a pressure plate for engaging the strip adjacent each of said tips.

5. The chart recorder according to claim 1 wherein said pressure means includes means for adjusting the amount of pressure exerted on the strip.

6. The chart recorder according to claim 5 wherein the pressure applied by said pressure means is such that a force of approximately 1.5 pounds is required to move a strip 8½ inches wide along the path.

7. The chart recorder according to claim 1 further including a guide means mounted in said frame above said supply stack for receiving the strip from the supply stack and for guiding it onto said platen.

8. The chart recorder according to claim 7 wherein said guide means is positioned above the stack a minimum distance from the top of the stack which allows the Z folded strip to enter the path of movement without sharp creases in said strip.

9. The chart recorder according to claim 1 wherein said drive means comprises a capstan drive having a capstan rotatable by driving means; an idler roll tangentially engaging said capstan with the strip received between said capstan and idler roll; said drive means having diverter means positioned in close proximity to the point of tangential engagement of said capstan and idler roll for insuring said strip remains in the path subsequent to passage between said capstan and idler.

10. The chart recorder according to claim 9 wherein the recording medium strip has a predetermined thickness and the spacing between said diverter means and said capstan and idler roll is less than approximately twice the thickness of the strip.

11. The chart recorder according to claim 10 wherein the spacing between said diverter means and said capstan and idler roll is approximately the thickness of the strip.

12. The chart recorder according to claim 1 wherein said Z-folded recording medium strip contains a plurality of transverse perforation lines, each of said lines having slots of defined transverse length separated by lands and wherein said pen tip is tubular and has an exterior dimension perpendicular to the movement path of the strip bearing a predetermined relationship to the length of said slots.

13. The chart recorder according to claim 12 wherein the exterior dimension of said pen is equal to or greater than the length of the slots.

14. The chart recorder according to claim 12 wherein the exterior dimension of said pen is less than the length of said slots by a predetermined amount.

15. The chart recorder according to claim 14 wherein the exterior dimension of the pen is less than the length of the slots by an amount proportional to the rapidity of movement of said pen tip and the strip.

16. The chart recorder according to claim 14 wherein the exterior dimension of said pen is up to 0.01 inches less than the length of said slots.

17. The chart recorder according to claim 16 wherein the exterior dimension of said pen is up to 0.007 inches less than the length of said slots.

* * * * *